June 2, 1953      S. V. ZAVOICO      2,640,521
SPLIT HEAD LOCKING SCREW
Filed June 1, 1949
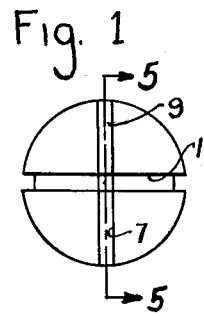
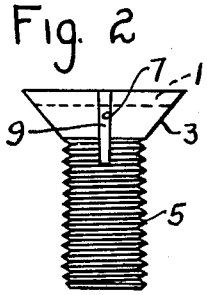
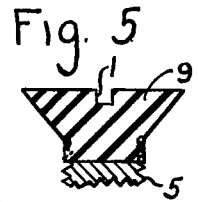
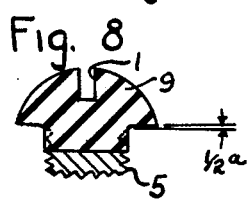
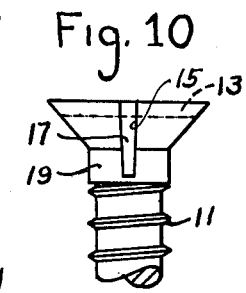
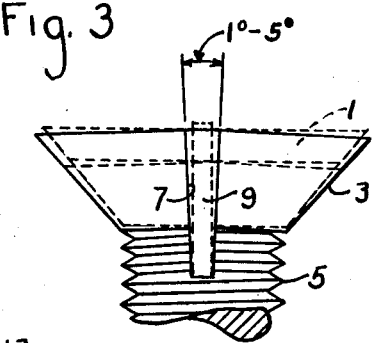
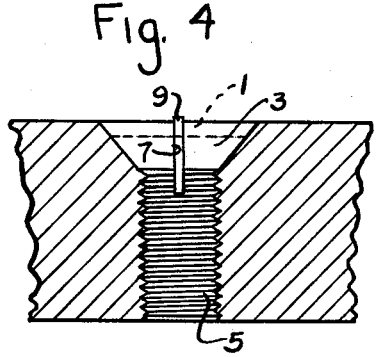
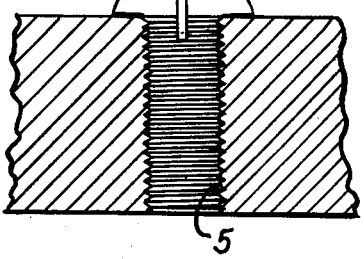
STEPHEN V. ZAVOICO
INVENTOR.
BY Edmund W. E. Kamm
ATTORNEY Patented June 2, 1953

2,640,521

UNITED STATES PATENT OFFICE 2,640,521

SPLIT HEAD LOCKING SCREW

Stephen V. Zavoico, Lake Forest, Ill., assignor to The Eagle Lock Company, Terryville, Conn., a corporation of Connecticut Application June 1, 1949, Serial No. 96,525

2 Claims. (Cl. 151—14)

It is an object of the invention to provide a vibration resistant screw.

Another object of the invention is to provide a screw which does not become loose until it is unscrewed a substantial portion of a revolution.

Yet another object of the invention is to provide a screw which resists unscrewing rotation with a relatively high torque for a substantial portion of a revolution.

A further object of the invention is to provide a screw with a filler material which will seal the threads of a screw as it is applied.

Yet another object of the invention is to provide a screw with a filler material which will seal the hole around the screw.

These and other objects will become apparent from a study of this specification and the drawings which are attached hereto and made a part hereof and in which:

Figure 1 is a top view of a flat head machine screw embodying the invention.

Figure 2 is an elevation of the screw of Figure 1.

Figure 3 is an enlarged view of the screw of Figures 1 and 2, exaggerated to show the principles.

Figure 4 is a view similar to Figure 2 but showing the screw in place in work pieces.

Figure 5 is a sectional view taken on the line 5—5 of Figure 1 showing the filler.

Figure 6 is a sectional view of the invention applied to a modified fillister head screw.

Figure 7 is a sectional view of the invention applied to an oval head screw.

Figure 8 is a sectional view of the invention applied to a modified round head screw.

Figure 9 is a view showing the round head screw in place in work pieces.

Figure 10 is an elevation of a wood screw employing the invention.

Referring first to Figures 1 to 5, respectively, which disclose a common flat head machine or cap screw having a driving groove 1, a taper 3 which terminates in the threaded body 5.

A slot is cut through the screw to a depth of about 1½ or two times the thickness of the head and preferably at right angles to the groove 1. The slot 7 is preferably very narrow so as not to remove any more metal than necessary.

The two halves of the screw on either side of the slot are then sprung or bent outwardly so that the angle included by the walls is between one and ten but preferably about five degrees, as shown, exaggeratedly in Figure 3. Both sides are preferably bent to the same degree.

While a greater angle may be used it makes it more difficult to drive the screw home and little additional benefit is obtained.

The slot may be, and preferably is, filled with a compressible material 9 such as a synthetic rubber of the "Neoprene" type which resists the action of oils, steam and water. Any other suitable plastic material or even soft metals may be used.

As the screw is driven home, the cylindrical sides of the tapped hole will force the two parts of the screw on opposite sides of the slot toward each other and the threads on the screw and in the hole are in heavy frictional contact. Further, some of the plastic material is squeezed out of the slot and enters the space between the threads sealing the screw in the hole and also increasing the frictional engagement between the threads. It also gets into the space between the taper and the countersink portion of the hole and tends to seal this.

In the form as illustrated in Fig. 3, when the sides of a flat head screw are bent outwardly from the slot, the angled side walls will be normally disposed at a greater angle to the axis of the screw and thereby permit the upper edge of the walls to engage the bottom of a counter-sunk recess, into which the screw is driven, and apply a retaining pressure due to the inherent resiliency in the screw.

Actual tests of screws made in accordance with this disclosure have shown that a screw drawn down with a torque of 30 inch-pounds will unscrew on application of a 28 inch-pound torque. However, this torque is maintained substantially constant for approximately one fourth of a revolution.

A standard screw of equal size drawn down with a 30 inch-pound torque will release with a 16 to 20 inch-pound torque and is free when rotated only from one to four degrees.

It has been established that the slot 7 has little effect on the strength of the screw.

Referring now to Figure 7, the oval head screw, when made in accordance with the above disclosure, exhibits the same beneficial results.

The fillister head and round head screws, shown in Figure 6 and Figures 8 and 9, respectively, involve a slightly different approach.

It was found that the benefits of the springing of the two parts of the screw which lie on opposite sides of the slot are practically nullified by the drawing together of the flat bottom of the head and the work piece.

Accordingly, in screws of this type, it is necessary to increase the angle between the bottom of the head and the screw beyond ninety degrees. The increase preferably being less than the angle *a* between the walls of the slot.

Of course, the plastic material 9 may also be used in these forms.

Referring to Figure 10, the same principles may be applied to a wood screw 11. The usual driving groove 13 preferably sets at ninety degrees to the slot 15, which is wedge shaped after the parts are bent, and a plastic material 17 may be included in the slot and that part of the shank 19 into which the slot extends.

In the case of wood screws, the plastic material may be pitch, tar, putty or any other suitable material such as the rubber disclosed above.

The action is the same as in the machine screw and the holding powers are improved.

It will be noted that the plastic material extends at least fully to the top of the screw head so that it will completely fill the slot and prevent the insertion of a screw driver therein when the attempt is made, by mistake or otherwise, to use this slot instead of the turning groove.

It will be further noted that, since the plastic material extends into the turning groove, it will be contacted by the screw driver, when it is inserted therein, and thereby provide for sticking the screw to the screw driver to permit placing the screw in hard-to-reach places. Also, if desired, the filling material may be made to extend across the slot so as to provide a firmer hold upon the end of the screw driver.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. As an article of manufacture a screw having an enlarged head with a turning groove therein to receive a screw driver and a threaded body, a slot formed in said head crosswise to said groove and extending into said body, the parts of the screw on opposite sides of said slot being bent outwardly to provide for binding said screw in position within a recess, and a material of plastic consistency contained within the slot and extending fully to the top of the head, said material filling substantially only said transverse slot.

2. A screw having a tapered head with angled side walls, a driving groove and a threaded body, a slot formed in the head transversely to the driving groove and extending into the body, the parts of the head at opposite sides of the slot being bent outwardly to thereby normally diverge the walls of the slot towards the top of the head and dispose the angular side walls of the head at a greater angle to the longitudinal axis of the head in the direction transversely of the slot and at a lesser angle in the direction parallel to the slot whereby, when the screw head is forced into contact with the bottom of a countersunk recess conforming to the lesser angle of the head side walls, the opposite parts of the head will be forced towards each other and cause closing of the slot and the portions of the side walls normally at a greater angle will apply a yielding pressure against the tapered bottom of the recess, and a plastic material contained in the slot and adapted to squeeze out between the angled head wall and the bottom of the recess, as the slot is closed, to provide a seal around the said head.

STEPHEN V. ZAVOICO.

References Cited in the file of this patent

UNITED STATES PATENTS

| Number | Name | Date |
|---|---|---|
| 679,970 | Keeler | Aug. 6, 1901 |
| 1,515,996 | Buchanan | Nov. 18, 1924 |
| 1,616,286 | Stimpson | Feb. 1, 1927 |
| 1,762,394 | Hosking | June 10, 1930 |
| 2,767,287 | Hosking | June 24, 1930 |
| 1,940,878 | Olson | Dec. 26, 1933 |
| 2,250,343 | Zigler | July 22, 1941 |
| 2,318,415 | Patzschke et al. | May 4, 1943 |
| 2,407,160 | Kahn | Sept. 3, 1946 |
| 2,445,172 | Gravinese et al. | July 13, 1948 |